United States Patent Office 3,071,483
Patented Jan. 1, 1963

3,071,483
MANUFACTURE OF COLLAGEN PRODUCTS
Shu Tung Tu, Ipswich, Mass., assignor to United Shoe Machinery Corporation, Boston, Mass., a corporation of New Jersey
No Drawing. Filed May 3, 1960, Ser. No. 26,399
7 Claims. (Cl. 106—155)

This invention relates to the preparation of tanned collagen fiber masses and particularly to the preparation of a leather-like sheet material.

In the United States Letters Patent 2,934,446 of April 26, 1960, to John H. Highberger and Robert A. Whitmore, entitled "Collagen Fiber Masses and Methods of Making the Same," there is disclosed a method for forming interlocked collagen fiber masses. That method involves forming a mixture of existing collagen fiber and collagen in aqueous solution at a controlled ionic concentration and pH, and maintaining the mixture at a temperature below about 5° C. to prevent precipitation from the collagen solution. The cold mixture is shaped as desired, for example into sheets. Thereafter, by warming, the collagen fibers are precipitated from solution in interlocking relation with the existing collagen fibers to form a skin-like material. This skin-like material is capable of being tanned to a leather-like condition either with or without intermediate treatments.

Operation under the process of the above-identified application involves the problems of maintaining the mixture below 5° C. during shaping, and of warming the shaped mixture under controlled conditions. The product obtained after precipitation by warming is at a pH value of from about 5.2 to 9.5 and it is necessary, in order to convert this to a leather-like condition, to immerse this material in an acid solution of a tanning agent such as a chrome or vegetable tanning agent.

It is an object of the present invention to form a collagen fiber mass from dissolved collagen by a procedure which eliminates the necessity for control of temperature.

It is a further object of the invention to accomplish in a single step the operations of converting dissolved collagen material mixed with existing collagen fibers to a leather-like condition.

To this end, and in accordance with a feature of the present invention, I have devised a process for precipitating fibers of collagen from solution with an agent effective to combine with collagen and to precipitate it from solution as fibers in interlocking relationship with each other and with existing collagen fibers present in the collagen solution.

I have discovered that collagen may be precipitated from solution at pH values as low as about 3 by the action of chromium compounds reactive with collagen. This precipitation is perfected by contacting the material containing dissolved collagen with an aqueous solution containing the collagen-reactive chromium compound.

In solutions more acid than about pH 5.2, collagen molecules in solution have net positive charges which prevent their aggregation into fibers and precipitation. According to one form of the process of the present invention, compositions including such more acid solutions of collagen are prepared and shaped as desired, the acidity preventing premature formation of collagen fibers even at room temperature or above. Thereafter, the acid compositions are treated with a metal compound, e.g. a chromium compound, effective to precipitate collagen fiber in the acid media.

In a preferred form of the invention, acid collagen solution is mixed with existing collagen fibers to form an acid mixture and this mixture is treated with a soluble chromium compound to precipitate the collagen. The invention will first be described as it is practiced in this form. However, it is to be understood that the collagen solution need not be in acid form provided it is otherwise prevented from premature precipitation and provided also that a sufficient acid value is provided, either in the solution of the chromium compound or in the collagen solution, that the pH of the solution of metal compound does not rise above about 5.

Collagen solutions useful in the present process may be formed by procedures known per se, such for example as the procedure shown in the application of John H. Highberger and Robert A. Whitmore referred to above. The procedure may include the steps of roughly grinding young mammalian skin, suitably calfskin, and dispersing the ground skin material in an aqueous acid bath at a pH of from 2 to 4.5. Usable acids include formic acid, acetic acid, propionic acid, citric acid, phosphoric acid, hydrochloric acid, sulfuric acid and other common organic and mineral acids which do not precipitate protein. The skin material is allowed to stand at a temperature below 25° C. and preferably near 0° C. for from 12 to 48 hours. The acid bath containing skin material is then preferably passed through a mechanical device to subject it to severe shearing action which brings the product to a pasty condition in which a high percentage of the collagen of the original skin material appears to be in solution.

Hide fiber material for combination with collagen solution may be prepared by the procedure described in greater detail in the copending application of Frederic C. Merriam et al., Serial No. 846,254, filed Oct. 14, 1959, and entitled "Preparation of Hide Fiber." As described more fully in that application, skin or hide material, such as limed unhaired hide, pickled hide, or unlimed hide, is washed, subdivided into pieces, preferably not smaller than one inch, and preferably chemically treated as by limited formaldehyde tannage to reduce the swelling tendency of the collagen fibers of the skin or hide. The treatment, which should be sufficient to provide a minimum of at least $\frac{1}{10}$% of combined formaldehyde based on the dried weight of the fibrous material and preferably not over 2%, brings the skin or hide material to a condition in which it can be reduced most effectively to its separate fibers.

The hide material is placed in a water bath and subjected to a mechanical device involving relatively moving surfaces which exert a shearing action for pulling or teasing the hide material into its constituent fibers and forming a pulp or suspension of the fibers in water.

The fibers and collagen solution may then be mixed in suitable mixing equipment. The collagen solution is acidic having a pH usually around 3.5 and the fibers are somewhat more alkaline, so that the mixture has a pH somewhat higher than desired. The pH of the mixture may be reduced by addition of acid to a value of about 3 to 4 and the mixture worked into a sheet as by rolling or pressing a mass of the material to a desired thickness.

Precipitation of collagen from the acid composition containing dissolved collagen, such as the sheet of the mixture of dissolved collagen and existing collagen fibers, may be effected by contacting a composition containing dissolved collagen with an aqueous solution of a chromium compound reactive with the collagen. The chromium compound precipitates and combines with the collagen from solution and also with existing collagen fiber in the composition. There is reason to believe that the chromium compound acts to establish cross linkages between collagen fibers, both those formed from solution and those already present in the composition before treatment. These cross linkages increase further the strength of the mass of intertwined pre-existing and precipitated collagen fibers by anchoring the fibers against relative slippage.

Compounds effective in aqueous solution to precipitate collagen from solution include the water soluble compounds of trivalent or hexavalent chromium. In particular, the compounds formed by partially neutralizing chromic salts such as chromic chloride and chromic sulfate give very desirable results. The reaction of these chromic salts with alkaline material brings the salt first to the stages referred to by tanners as "one-third basic" and then to higher basicity up to as high as about 50% basic with an optimum of 40% for the present purpose. Use of the basic chromium solution not only precipitates collagen from solution but also tans both precipitated and existing collagen to give a desirable relatively high "shrink temperature."

Precipitation of collagen from solution occurs in the pH range of about 3.0 to about 5. The pH of the chrome solution and/or the material containing dissolved collagen are adjusted so that when the solution and material are brought together, the resulting pH is in this range.

A masking or complexing agent such as the ammonium and alkali metal salts of formic acid and of hydroxy carboxylic acids including sodium tartrate, sodium phthalate or sodium gluconate is used with the chromic salts, these agents being capable of forming complex molecules with the products formed by partial neutralization of the salts. The complex compounds thus formed are relatively stable so that the pH of the solutions may be raised up to as high as about 5 without precipitation of chromic oxide. For use in the process of the present invention, the solution is ordinarily adjusted by addition of an alkaline material such as sodium hydroxide to a pH of from about 3 to about 5, preferably about 4. It is to be noted that with the complexed solutions the pH of the solution may require as much as two days to stabilize, during which time additional alkaline material may be added to achieve the desired final pH value.

The chromium solutions should contain about 1% to 2% by weight of the compound calculated on the basis of the weight of the oxide and may contain as much as 5%. It has been found that stability of chromic salts against precipitation is obtained where as little as one part by weight of complexing agent is used for two parts by weight of the chromic compound, and that there may be used as much as about three parts by weight of the complexing agent to one part of the chromic compound. The preferred compositions contain chromium, calculated as the oxide, and complexing agent in the ratio of approximately 1:2.

Compositions containing dissolved collagen may be either cold, e.g. below 5° C., or at room temperature when brought in contact with the solution of the chromium compound. That is, with compositions which have a pH below 5.2, collagen fiber will not precipitate from the solution at room temperature. Somewhat different results are obtained when the composition is at room temperature than when it is cold. It appears that the cold composition reacts somewhat less vigorously with the chromium so that more uniform impregnation is obtainable and also the time for development of collagen fibers is somewhat greater so that the product is somewhat stronger than where precipitation is carried out with a room temperature composition.

It is also possible to combine the chromium precipitation of collagen with the thermal precipitation of the Highberger et al. procedure referred to above. Thus, a cold mixture of collagen solution and undissolved fiber at controlled ionic concentration and pH of 5.2 to 9.5 and ionic strength of 0.1 to 1.0 may be shaped while at a temperature below 5° C. to prevent precipitation of collagen from solution and thereafter brought in contact with a solution of chromium compounds to precipitate collagen from the solution. Particularly where the cold mixture of collagen solution and fiber is formed into a sheet, it has been found that warming the sheet to effect partial thermal precipitation of the collagen fiber before chromium treatment presents certain advantages. The partial precipitation gives strength to the sheet so that it may be handled more easily without disruption, for example, in transferring it to apparatus for treatment with chromium compound. There is some indication that the preliminary partial precipitation of the collagen through warming affects the character of the sheet. That is, a sheet so prepared appears somewhat more open and is somewhat more compressible than a sheet prepared without such warming.

The combination of chrome tanning agent with collagen provides as a known characteristic the increase of the shrink temperature of the collagen fiber. It appears that in the present relationship, where the chrome compound is a tanning material, the chromium acts on the collagen material and the heat resistance-increasing effect of the chromium exerts itself on the collagen components even before a full tanning. That is, full reaction of the chromium material with the collagen material can be speeded up without detriment to the collagen by warming the chromium bath to a temperature which may be as high as 50° C. Rapid and complete interaction is obtained with no observable degradation of the collagen even though heating a solution of collagen to so high a temperature would result in at least partial degradation of the collagen.

The product of contacting material containing dissolved collagen with chromium solutions to precipitate collagen many be treated according to known procedure. It may be dyed with water soluble acid or direct dyestuffs. The product may be treated to incorporate a humectant, e.g. sorbitol, and/or a fat liquor such as an emulsion of neatsfoot oil. Where the product is in sheet form it is desirable to subject it, preferably after drying, to a needling operation such as that described in my copending application Serial No. 805,032, filed April 8, 1959, entitled "Collagen Fiber Sheet Material and Method of Making." Any finish applicable to leather may be applied to the product.

The following examples are given as of possible assistance in understanding the invention; but it is to be understood that the invention is not limited to the specific materials or conditions shown in the examples:

*Example 1*

43 lb. of salt calfskin scraps were unhaired, washed, and added to 120 lbs. of water containing 54 cc. of a commercial $H_3PO_4$ and 138 cc. of acetic acid. After stirring the hide in, the pH was 3.1. The bath was allowed to stand six days with occasional stirring. At the end of this time the scrap material was well swollen and the pH was 4.0. The scraps were cooled with cold water, drained, and run several times through a mill comprising closely spaced, relatively moving rough plates, i.e. a Bauer mill. The milled product weighed about 100 lbs. To this were added 20 lbs. of water containing 42 cc. of mixed acid (138 cc. of acetic acid and 54 cc. of phosphoric acid). After stirring and standing briefly the pH of the mix was 3.8. The mix was then sent through the Bauer mill again and 40 additional lbs. of water and 100 cc. of the same acid mixture were added and stirred in. After standing overnight the pH of the mix was 3.7. 20 lbs. of water and 92 cc. of the same acid mixture were added to the mix and the mix was then sent through the Bauer mill using close set, fine plates and came out as a smooth pasty mass at pH 3.7. In this mass a high proportion of the collagen initially present was in solution.

Pickled split cowhide trimmings were washed and brought to a pH of 8.5 by addition of sodium hydroxide. The trimmings were cut to approximately 1" pieces and 50 lbs. of the trimmings were placed in a Hollander type paper beater with 150 lbs. of water to give a solids content of about 5%. The beater was operated for ½ hr. at the end of which time the pH was readjusted to 8.5 and 300 cc. of 37% formaldehyde were added. The beating was continued for 5 minutes and the resultant slurry was allowed to stand for 2 hrs., then discharged onto screens and drained overnight. The drained material was passed through rubber squeeze rolls to bring its solids concentration to about 25%. The squeezed material was then put back in the beater and water added to bring the solids content in the beater to about 5%. The beater was operated for one hour with the beater knife close to the bed plate (0.003" to 0.005" clearance). The slurry was then removed from the beater, drained overnight and squeezed through rubber rollers to give a fibrous mass of about 26% solids.

To 2700 grams of the slurry from the Bauer mill at from 0° to 5° C. there were slowly added in a worm type mixer 2600 grams of the drained and squeezed fiber and 2700 cc. of water. This mixture had a pH of about 4.5. After mixing for 1 hr. the mixture was placed on a polyethylene sheet, covered with a sheet of polyethylene terephthalate resin ("Mylar") and spread by rolling and working to a thickness of 0.1".

The resin sheet was stripped from the layer of mixture and the layer of mixture was laid face down on a porous support, after which the polyethylene sheet was stripped. The deposited sheet of mixture was then immersed in a chromium solution of the following composition:

| | Parts by weight |
|---|---|
| Chromic sulphate, $Cr_2(SO_4)_3 \cdot XH_2O$ | 10 |
| Water | 160 |
| Sodium formate | 5 |

The chromium solution was made by dissolving the chromic sulphate in the water and adding the sodium formate to the solution. The pH of this solution was less than 4 and was adjusted to pH 4 by addition of sodium hydroxide. The resulting solution was allowed to stand for two days to stabilize the addition of further sodium hydroxide to maintain the pH at about 4. Analysis of the resultant chrome solution showed a chromic oxide content of 1.3% and a sodium formate concentration of 2%.

The sheet of pre-existing collagen and collagen from solution was maintained in contact with the chrome solution for one hour and was then removed and allowed to stand overnight. The sheet was washed three times with tap water and solvent dried with acetone. It was found that the sheet had taken up about 2% of chromic oxide based on the weight of the collagen material.

The sheet was soaked in a 4% solution of oleic acid in isopropyl alcohol for one hour. The sheet was then withdrawn and allowed to dry. The dried sheet material resembled leather and on testing had a shrink temperature of 100° C.

The sheet was then passed between a reciprocating bar carrying needles on its lower surface and the sheet manipulated beneath the needle bar to provide an average of 1500 perforations in the sheet per square inch. The diameter of the holes was from about 0.1 to about 0.2 mm.

After the needling treatment a 20% solid solution of a butadiene acrylonitrile copolymer synthetic rubber latex was spread on the surface of the sheet. The latex contained 5% of a wetting agent (Triton X-200) and was spread on in amount to provide 5% solids based on the weight of the dried sheet. The sheet was dried and thereafter conventional acrylic resin emulsion finish was spread on the surface of the sheet and allowed to dry.

Thereafter the sheet was finished by conventional procedure including application of a commercial base coat containing pigment, wax and resin. The sheet was embossed by the usual commercial embossing procedure and finally a coat of an aqueous dispersion of lacquer was applied as a top coat and the sheet was plated. The resulting product resembled a good grade of natural leather.

*Example II*

120 lbs. of trimmings from green salted light (4–6 lbs.) calfskins were placed in a drum and washed in running cold water at a drum speed of about 12 r.p.m. for about 12 hours to remove the salt. The trimmings were then drained and passed through a plate-type meat grinder of which the plate had 3/16" circular holes. The ground material was washed and drained, and the drained mass weighed about 80 lbs.

To the washed and drained mass 2.5 lbs. of glacial acetic acid were added and vigorously stirred in. The acidified mass had a pH of about 3.75 and a dry solids content of about 10%, and was allowed to stand at room temperature for two days.

After standing the acidified skin material was cooled by mixture with chipped ice and passed through a plate-type shearing mill of which the plates had an edge clearance of about 0.005" to 0.010". The material left the mill as a smooth plaste whitened by occlusion of fine air bubbles. On standing the air bubbles became aggregated, absorbed, or removed, leaving an opaque, tan-colored paste having a solids content of about 7%.

Trimmings from limed steer hides were washed in a rotating drum (12 r.p.m.) for two hours in running tap water. 100 lbs. of the washed trimmings were placed in 20 gal. of water and 400 ml. of glacial acetic acid were added and thoroughly stirred in to partially neutralize the trimmings. A cut section of the trimmings showed a pH of about 4. The trimmings were again washed with running water in a drum for a period of about 1½ hours and thereafter were drained. An aqueous solution of 6.25 lbs. of a wetting agent in 6.25 lbs. of water at 30° C. were added to the trimmings and drummed in. Thereafter, water at 30° C. was introduced into the drum and washing was continued with drumming until the effluent was clear. The trimmings were drained. Thereafter 30 gal. of water and 2850 ml. of 37% aqueous formaldehyde solution were drummed into the trimmings for 30 minutes. The trimmings were then removed, placed in a prepared mixture of 20 gal. of water and 1900 ml. of 37% aqueous formaldehyde solution and stirred to effect a uniform mixture. The pH of the mixture was brought to about 8 by the addition of 54 grams of sodium hydroxide and the material was allowed to stand for 5 days. The trimmings were then washed in the drum in running water for 2 hours. The material was cut into 1" strips and then passed through a plate-type meat grinder having 5/8" holes. The ground material was drained and introduced into a Hollander paper beater in which the material was beaten for 10 to 15 minutes after the "bumping," due to the presence of large lumps, had stopped. The beaten material which was a uniform suspension of hide fibers was drained on a 20 mesh screen. The mass of drained fibers was then passed between tightly pressed rubber rolls to remove additional water. At this point the formaldehyde content of the fibers was about 1% on a dry solids basis; and the dry solids content was about 25% of the pressed fiber mass.

2030 grams of the acidified calfskin material were placed in a 1 gal. jar, and cooled by addition of about 1000 grams of chipped ice to between 0° and 5° C. A solution of 46.98 grams of $K_2HPO_4$ in about 200 ml. of water was added and mixed in thoroughly and the mixture was then neutralized with about 125 ml. of 6 N KOH to give a pH of about 7.5. Ice and water were added to bring the volume of the mixture to 1 gal. and the final mixture to an ionic strength of about 0.4. 1333 grams of this chilled neutral mass was placed in a screw-type, jacketed mixer which had been precooled to from 0° to 2° C. by circulating a salt and ice brine through the jacket. The mixer was started and 1136 grams of the pressed fiber was introduced slowly in small bits torn from the mass of fibers. The material was pressed down in close contact with the screw of the mixer and subjected to mixing for a period of about one hour until the mass was a smooth, uniform paste which was "doughy" in its resistance to extreme deformation. The mixture was taken from the mixer and rolled into a sheet ¼" thick using rolling strokes, first in one direction and then in a direction perpendicular to the first direction in order to move the fiber-containing mixture uniformly in all directions in the plane of the sheet. The mixture was kept below 5° C. from the time when it was first prepared until rolling was completed.

The sheet was then immersed in a chromium solution of the same composition as that used in Example I and maintained in contact with the solution for one hour. The sheet was then removed from the solution and allowed to stand overnight, after which it was washed three times with tap water and solvent dried with acetone. It was found that the sheet had taken up about 2.5% of chromic oxide based on the weight of the collagen material.

The sheet was then treated by the procedure set forth for the treatment of the chrome reacted sheet of Example I and formed a product resembling a good grade of natural leather.

*Example III*

A sheet of a mixture of hide fibers and the acidified calfskin material prepared in accordance with Example II was covered by spreading a thin polyethylene film into close contact with its exposed surface. The sheet was then warmed to 37° C. slowly and held at this temperature for 60 minutes. At the end of this heating a portion of the dissolved collagen content in the mixture had reconstituted as fibers and the sheet although tender could be handled without support. The polyethylene was stripped from the sheet and the sheet was immersed in a chrome solution of the composition set forth in Example I for 60 minutes and was then removed and allowed to stand overnight.

The sheet was washed three times with tap water and solvent dried with acetone and it was found that the dried sheet had taken up about 3.0% of chromic oxide based on the weight of the collagen material.

The chromium treated sheet was then subjected to further treatment corresponding to the treatment of the chromium treated sheet of Example I.

The resultant product resembled a good grade of leather and was somewhat more open than the product obtained according to Example II.

Having thus described my invention, what I claim as new and desire to secure by Letters Patent of the United States is:

1. A method for forming skin-like collagen fiber masses comprising the steps of forming a mixture of existing collagen fibers and an aqueous solution of collagen, said mixture being adjusted as to temperature and pH to prevent premature precipitation of collagen from solution, shaping the mixture into a sheet, thereafter bringing the sheet into intimate penetrating contact with an aqueous solution containing an approximately 30% to 50% basic chromium tanning compound, said solution of chromium compound containing from about 1% to about 5% by weight of chromium compound calculated as $Cr_2O_3$, the pH and quantity of said solution of chromium compound penetrating said sheet providing a pH in said sheet of from about pH 3 to about pH 5, reacting said chromium compound with the dissolved collagen to precipitate collagen fibers containing at least 0.2% by weight of combined chromium calculated as $Cr_2O_3$ based on the weight of the precipitated collagen, and removing the fluid from the sheet.

2. A method for forming tanned skin-like collagen fiber masses comprising the steps of forming a mixture of existing collagen fibers and an aqueous solution of collagen, said mixture being adjusted as to temperature and pH to prevent premature precipitation of collagen from solution, shaping the mixture into a sheet, thereafter bringing the sheet into intimate penetrating contact with an aqueous solution having a pH of from about 3 to about 4.5 and containing a masked approximately 30% to 50% basic chromium tanning compound, said solution containing from about 1% to about 5% by weight of chromium compound calculated as $Cr_2O_3$, the pH and quantity of said solution of chromium compound penetrating said sheet providing a pH in said sheet of from about pH 3 to about pH 5, reacting said chromium compound with the dissolved collagen and existing collagen fibers to precipitate collagen fibers and to provide a combined chromium content in said existing and precipitated collagen fibers of at least about 1% by weight calculated as $Cr_2O_3$ based on the weight of said collagen fibers, and removing the fluid from the sheet.

3. A method for forming tanned skin-like collagen fiber masses comprising the steps of forming a mixture of existing collagen fibers and an aqueous solution of collagen, said mixture being adjusted as to temperature and pH to prevent premature precipitation of collagen from solution, shaping the mixture into a sheet, hereafter bringing the sheet into intimate penetrating contact with an aqueous solution having a pH of from about 3 to about 4.5 and containing a masked approximately 40% basic chromium tanning compound, said solution containing from about 1% to about 5% by weight of chromium compound calculated as $Cr_2O_3$ and containing from about one to about three parts by weight of masking agent selected from the group consisting of ammonium and alkali metal salts of formic acid and hydroxy carboxylic acids to one part by weight of the chromium compound present in the solution, the pH and quantity of said solution of chromium compound penetrating said sheet providing a pH in said sheet of from about pH 3.5 to about pH 5, reacting said chromium compound with the dissolved collagen and existing collagen fibers to precipitate collagen fibers and to provide a combined chromium content in said existing and precipitated collagen fibers of at least about 1% by weight calculated as $Cr_2O_3$ based on the weight of said collagen fibers, and removing the fluid from the sheet.

4. A method for forming tanned skin-like collagen fiber masses comprising the steps of forming a mixture of existing collagen fibers and an aqueous solution of collagen, said mixture being adjusted as to temperature and pH to prevent premature precipitation of collagen from solution, shaping the mixture into a sheet, thereafter bringing the sheet into intimate penetrating contact with an aqueous solution having a pH of from about 3 to about 4.5 and containing a masked approximately 40% basic chromium tanning compound, said solution containing from about 1% to about 5% by weight of chromium compound calculated as $Cr_2O_3$ and containing from about one to about three parts by weight of sodium formate as masking agent to one part by weight of the chromium compound present in the solution, the pH and quantity of said solution of chromium compound penetrating said sheet providing a pH in said sheet of from about pH 3 to about pH 5, reacting said chromium compound with the dissolved collagen and existing collagen fibers to precipitate collagen fibers and to provide a combined chromium content in said existing and precipitated collagen fibers of at least about 1% by weight calculated as $Cr_2O_3$ based on the weight of said collagen fibers, and removing the fluid from the sheet.

5. A method for forming tanned skin-line collagen fiber masses comprising the steps of forming a mixture of existing collagen fibers and an aqueous solution of collagen, adjusting the pH of the mixture to from about pH 3 to about pH 4.5, shaping the mixture into a sheet, thereafter bringing the sheet into intimate penetrating contact with an aqueous solution having a pH of from about 3 to about 4.5 and containing a masked approximately 40% basic chromium tanning compound, said solution containing from about 1% to about 5% by weight of chromium compound calculated as $Cr_2O_3$ and containing from about one to about three parts by weight of sodium formate as masking agent to one part by weight of the chromium compound present in the solution, the pH and quantity of said solution of chromium compound penetrating said sheet providing a pH in said sheet of from about pH 3 to about pH 5, reacting said chromium compound with the dissolved collagen and existing collagen fibers to precipitate collagen fibers and to provide a combined chromium content in said existing and precipitated collagen fibers of at least about 1% by weight calculated as $Cr_2O_3$ based on the weight of said collagen fibers, and removing the fluid from the sheet.

6. A method for forming tanned, skin-like collagen fiber masses comprising the steps of forming a mixture of existing collagen fibers and an aqueous solution of collagen and adjusting the mixture to a pH of from about 5.2 to about 9.5 and ionic strength of 0.1 to 1.0 while maintaining the temperature at not over about 5° C. to prevent precipitation of collagen from solution, shaping said mixture into a sheet while maintaining the mixture at temperatures not over about 5° C., thereafter bringing the layer into intimate penetrating contact with an aqueous solution having a pH of from about 3 to about 4.5 and containing a masked approximately 40% basic chromium tanning compound, said solution containing from about 1% to about 5% by weight of chromium compound calculated as $Cr_2O_3$ and containing from about 1 to about 3 parts by weight of masking agent to 1 part by weight of the chromium compound present in the solution, reacting said chromium compound with the dissolved collagen and lightly tanned fibers to precipitate collagen fibers and to provide a combined chromium content in said existing and precipitated collagen fibers of at least about 1% by weight calculated as $Cr_2O_3$ based on the weight of said collagen fibers, and removing the fluid from the sheet.

7. A method for forming tanned skin-like collagen fiber masses comprising the steps of forming a mixture of existing collagen fibers and an aqueous solution of collagen at pH 5 to pH 9.5 and ionic strength of 0.1 to 1.0 while maintaining the temperature at not over about 5° C. to prevent precipitation of collagen from solution, shaping the mixture into a sheet while maintaining the mixture at not over about 5° C., thereafter raising the temperature of the mixture sufficient partially to precipitate collagen fibers from dissolved collagen in the mixture, bringing the sheet into intimate penetrating contact with an aqueous solution having a pH of from about 3 to about 4.5 and containing a masked approximately 40% basic chromium tanning compound, said solution containing from about 1% to about 5% by weight of chromium compound calculated as $Cr_2O_3$ and containing from about one to about three parts by weight of masking agent to one part by weight of the chromium compound present in the solution, the pH and quantity of said solution of chromium compound penetrating said sheet providing a pH in said sheet of from about pH 3 to about pH 5, reacting said chromium compound with remaining dissolved collagen and with existing collagen fibers to precipitate such remaining dissolved collagen and to provide a combined chromium content in said existing and precipitated collagen fibers of at least about 1% by weight calculated as $Cr_2O_3$ based on the weight of said collagen fibers, and removing the fluid from the sheet.

References Cited in the file of this patent
UNITED STATES PATENTS

| | | |
|---|---|---|
| 2,934,446 | Highberger et al. | Apr. 26, 1960 |
| 2,934,447 | Highberger et al. | Apr. 26, 1960 |